United States Patent [19]
Wupper et al.

[11] Patent Number: 4,761,043
[45] Date of Patent: Aug. 2, 1988

[54] METHOD AND CIRCUIT CONFIGURATION FOR THE CONTROL OF WHEEL SLIP IN VEHICLES WITH ALL-WHEEL DRIVE

[75] Inventors: Hans Wupper, Friedrichsdorf; Gunther Buschaman, Griesheim, both of Fed. Rep. of Germany

[73] Assignee: Alfred Teves GmbH, Frankfurt am Main, Fed. Rep. of Germany

[21] Appl. No.: 936,177

[22] Filed: Dec. 1, 1986

[30] Foreign Application Priority Data

Nov. 30, 1985 [DE] Fed. Rep. of Germany ....... 3542417

[51] Int. Cl.⁴ .................... B60T 8/58; B60T 8/60; B60K 17/356; B60K 17/35
[52] U.S. Cl. .................................. 303/100; 303/103; 180/244; 180/249
[58] Field of Search ............... 74/710.5; 180/197, 244, 180/248, 249; 188/181 A, 181 R; 303/100, 103, 110, 111, 119, 93

[56] References Cited

U.S. PATENT DOCUMENTS

| 4,367,529 | 1/1983 | Masclet et al. | 303/93 X |
| 4,467,886 | 8/1984 | De Claire et al. | 180/197 |
| 4,538,700 | 9/1985 | Suzuki | 180/197 |
| 4,585,280 | 4/1986 | Leiber | 303/100 |
| 4,589,511 | 5/1986 | Leiber | 180/197 |

FOREIGN PATENT DOCUMENTS 3418520 11/1985 Fed. Rep. of Germany .

Primary Examiner—Andres Kashnikow
Assistant Examiner—Timothy Newholm
Attorney, Agent, or Firm—James B. Raden; Robert P. Seitter

[57] ABSTRACT

In order to control the wheel slip with an anti-lock brake system, in a vehicle with all-wheel drive and lockable differentials (29, 33), in particular with a lockable distribution differential (29), further braking pressure rise in the rear-wheel brakes (9, 10) is prevented for a predetermined period of time, with the locks (34, 35) engaged and with slip control activated. As a result, the driving stability of the vehicle is increased during braking with slip control and with the differential locks (34, 35) engaged.

8 Claims, 2 Drawing Sheets

4,761,043

METHOD AND CIRCUIT CONFIGURATION FOR THE CONTROL OF WHEEL SLIP IN VEHICLES WITH ALL-WHEEL DRIVE

BACKGROUND OF THE INVENTION

The present invention relates to a method for the control of wheel slip by means of an anti-lock brake system, provided for road vehicles, with all-wheel drive and a lockable distribution differential or with a connectible drive of the second vehicle axle and a fixed coupling between front-axle and rear-axle drive. The present invention further relates to a circuit configuration for implementing this method, with sensors for the measurement of the wheel rotational behavior and with circuits for the logic combining of the sensor signals as well as for the generation of electric braking-pressure control signals. By use of these signals, valves can be changed over which are inserted into the pressure-fluid conduits of the brake system. As a result, upon the occurrence of tendencies to lock the braking pressure is controllable in the wheel brakes individually and/or jointly in wheel brakes combined to form groups.

Methods and circuitries for the electronic control of wheel slip are known. This control prevents locking of the wheels as a consequence of excessive braking force, and to thereby maintain steerability and driving stability of the vehicle even in unfavorable situations such as in the event of panic stops, on icy roads or aquaplaning, etc., and to obtain a shortest possible stopping distance. In vehicles having only one driven axle, the information required for the control, including the vehicle reference speed which corresponds approximately to the vehicle speed at optimal slip, can be derived from the rotational behavior of the individual wheels and from the sensor signals, respectively. When interpreting the sensor signals, it is advantageous to distinguish between driven and non-driven wheels, as can be taken, for instance, from German laid-open print No. 22 54 295.

In vehicles with all-wheel drive, however, the evaluation of the sensor signals and the formation of the reference variable, namely the vehicle reference speed, is considerably complicated by the coupling of all wheels by way of the drive shafts, by the transmission of drive torques and brake torques caused thereby as well as by the high moments of inertia caused by the drive elements connected to the wheels. By reason of the wheels coupled by way of the drive shafts mutually influencing each other, variations of the brake force or friction force between tires and road can no longer be recognized definitely by virtue of measurement of the rotational behavior of the individual wheels and logic combining of the measured values. In many situations, coupling of the wheels results in an almost synchronous behavior of all wheels, which renders it very difficult to detect instability, that is, an imminent locked condition.

In all-wheel driven vehicles with lockable distribution differential or in vehicles with connectible drive of the second vehicle axle and fixed coupling between front-axle and the rear-axle drive, the described problems in interpreting the wheel rotational behavior are even more pronounced.

To avoid these difficulties, it has been known to automatically set the anti-lock control out of function as soon as the differential locks are engaged. However, this alternative bears the disadvantage that especially in situations which would necessitate both the differential locks and the anti-lock control to preserve driving stability, slip control must be dispensed with.

It has also been proposed to design a vehicle with all-wheel drive such that the brake-slip control signals immediately will cause disengagement of the locks in the differentials (German published patent application No. P 34 18 520). A principally different proposal aims at monitoring the rotational behavior of the wheels according to predefined criteria and at varying the control concept for a specific time span upon the occurrence of a wheel rotational behavior typical of overspin. As long as there is the tendency to overspin, the braking pressure control dependency on wheel slip will be discontinued, and pressure control will be determined by the wheel acceleration and deceleration alone (German published patent application No. P 3521960).

It is an object of the present invention to devise a slip control for vehicles with all-wheel drive which permits controlled braking even under unfavorable conditions, in the presence of a fixed coupling of the front-axle drive with the rear-axle drive, and which above all ensures a stable driving behavior in every situation.

SUMMARY OF THE INVENTION

This object is achieved in a method of the type initially referred to, the special features of which reside in that, when the differential lock in the distribution differential is engaged, that means in the event of fixed coupling of the front-axle and the rear-axle drive, after response of the slip control, continued, that is renewed, braking pressure rise in the rear-wheel brakes will be prevented for a predetermined period of time, that means until termination of the control period or for a duration depending on the wheel rotational behavior and/or the vehicle deceleration.

Hence it follows that the inventive method accomplishes a major improvement of slip control in a surprisingly simple fashion. The instant invention is based on the knowledge that in all-wheel drive, at any time, at least one rear wheel must generate great lateral guiding force in order to safeguard driving stability. The coupling of all wheels and, more particularly, the fixed coupling after engagement of the locks in the distribution differential and/or rear-axle differential leads, however, to a largely synchronous wheel run, which has as a result among others that the rear wheels may become unstable practically simultaneously. The slip control and the re-acceleration of the rear wheels during the control period will therefore commence too late. The known and usual select-low control at the rear axle which, in conventionally driven vehicles, that means driven at one axle only, causes "braking at a lower rate" of that rear wheel having the better road contact to become practically ineffective by the mechanical coupling in all-wheel drive. According to the present invention, this disadvantage is overcome by precluding a further pressure rise at the rear axle after response of the slip control, the front wheel becoming unstable first in the event of conventional dimensioning and axle-load distribution. A relatively great lateral guiding force is maintained at the rear wheels. By way of the fixed coupling of the driving tracks, a driving torque is transmitted from the rear axle onto the front axle, and thereby the re-acceleration of that front wheel is favored which had become unstable and thus had initiated control. Another reduction of the pressure at the rear axle remains possible, which is necessary for instance for slip control when the vehicle reaches a road surface with a lower frictional value.

In a favorable circuit configuration for implementing the inventive method, the inventive improvement resides in that a combining and blocking circuit is provided which shuts off continued pressure rise in the rear wheel brakes as long as there are prevailing a slip control signal and a signal indicative of the engagement of the differential lock or the coupling of the front-axle and the rear-axle drive.

In another embodiment of the circuit configuration according to this invention, multidirectional control valves are inserted into the pressure-fluid conduits to the rear-wheel brakes which valves are adapted to be changed over by the output signal of the combining and blocking circuit and which, after change-over, interrupt the pressure-fluid flow. To this end, the inlet valves which are provided anyway in the conduits leading to the rear-wheel brakes and serve for slip control can be actuated by the combining and blocking circuit.

BRIEF DESCRIPTION OF THE DRAWING

Further features, advantages and applications of the instant invention can be taken from the following illustration of an embodiment with reference to the accompanying drawings wherein.

DETAILED DESCRIPTION

Figure 1:
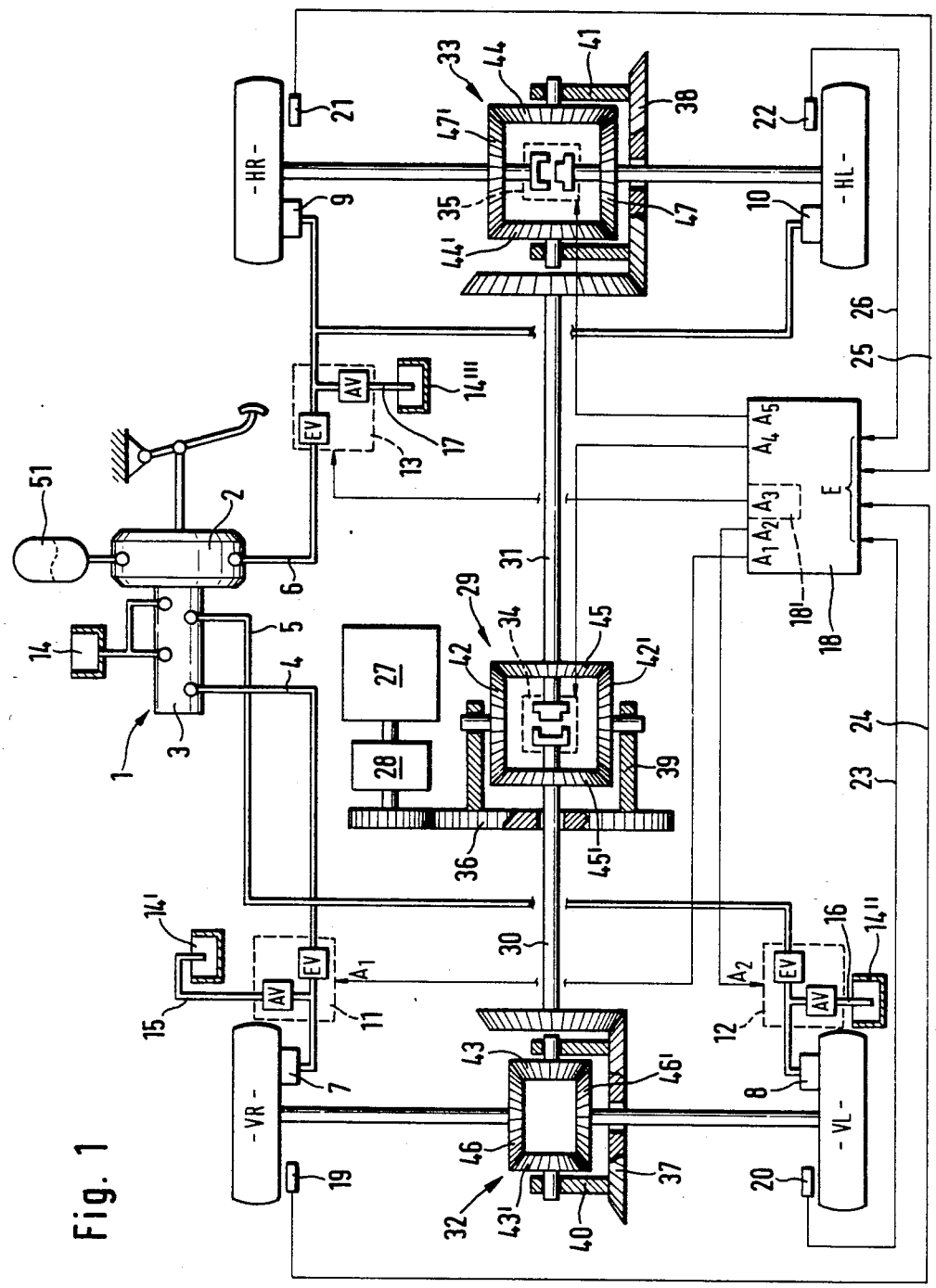
FIG. 1 is a schematic view of the most important parts of the brake system and the driving tracks of a vehicle with all-wheel drive and lockable differentials.

To explain the inventive method, FIG. 1 shows a vehicle with all-wheel drive and with an anti-lock hydraulic brake system. There is provision of a three-circuit braking pressure generator 1 which herein is composed of a hydraulic braking pressure generator 2 and a tandem master cylinder 3 and to which the front-wheel brakes 7, 8 and the rear-wheel brakes 9, 10 are connected by way of pressure-fluid conduits 4, 5, 6. Thus, the front-wheel brakes 7, 8 are hydraulically isolated from one another, while the rear-wheel brakes 9, 10 belong to one joint hydraulic circuit via the pressure-fluid conduit 6. The braking pressure generator 2 possesses a pressure-compensating and pressure-fluid supply reservoir 14.

To control the braking pressure and thus the wheel slip, electromagnetically actuatable multidirectional control valve assemblies 11, 12, 13 are inserted into the pressure-fluid conduits 4, 5, 6. These assemblies 11, 12, 13 each consist of one pair of inlet valve and outlet valve EV, AV, by which the pressure-fluid flow to the front-wheel and the rear-wheel brakes 7, 8 and 9, 10, respectively, and be closed. For the purpose of pressure reduction, a connection to the pressure-compensating reservoirs 14', 14" and 14''' can be opened for a short time by way of return lines 15, 16, 17. Expediently, these pressure-compensating reservoirs are structurally united with the reservoir 14 of the master cylinder.

The hydraulic part of the brake system also incorporates an auxiliary-pressure supply system which herein is represented by a pressure accumulator 51, to which normally a (non-illustrated) hydraulic pump with electromotive drive is associated.

An electronic control unit 18 and wheel sensors 19, 20, 21, 22 are required for slip control and to prevent a braking pressure rise in the rear-wheel brakes 9, 10 for a period of time, preferably until termination of slip control or for a period of time depending on the wheel rotational behavior and/or vehicle deceleration. The control unit 18 contains hard-wired or programmed circuits, such as microcomputers, as well as amplifiers that are valve drivers, which serve to generate the electric signals necessary for switching over the valve assemblies 11, 12, 13. The information about the wheel rotational behavior is in the form of alternating voltages, the frequencies thereof being representative of the wheel revolutions, are produced by the sensors 19, 20, 21, 22 and introduced into the control unit 18 by way of signal lines 23, 24, 25, 26. The inputs of the control unit 18 are designated by E. By way of the outputs $A_1$, $A_2$, $A_3$, the electric braking pressure control signals are supplied to the valve assemblies 11, 12, 13. Electric signals for the actuation of the differential locks described hereinbelow are available at further control unit outputs, namely at $A_4$ and $A_5$.

The vehicle according to FIG. 1 comprises a drive unit 27, that is a vehicle engine, which transmits the drive torque to a distribution differential 29 by way of an automatically or manually operated gear unit 28. From the differential 29, the torque is transmitted by way of drive shafts 30, 31 onto a front-axle differential 32 or, respectively, onto a rear-axle differential 33 as well as finally from said differentials onto the front wheels VR, VL and onto the rear wheels HR, HL.

The distribution differential 29 and the rear-axle differential 33 are lockable by means of couplings 34 and 35 which can be designed as claw couplings or visco couplings, in order to improve the transmission of the driving torque onto the road under unfavorable road conditions. Normally, the front-axle differential 32 is not designed lockable because coupling of the two split drive axles of the front wheels would impair steerability of the vehicle too much.

The three differentials 29, 32 and 33 each contain as essential parts each one drive wheel 36, 37, 38 to which a housing 39, 40, 41 is secured. From these housings, the driving torques are transmitted in a known fashion by way of two differential pinions 42, 42', 43, 43' and 44, 44' each onto axle-drive bevel wheels 45, 45'; 46, 46'; 47, 47' which are connected to the drive shafts 30, 31, that means to drive split axles leading to the wheels VR, VL; HR, HL.

Figure 2:
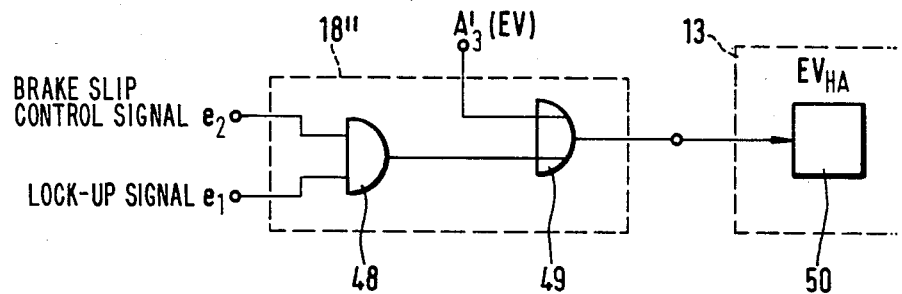
FIG. 2 is an additional electric circuit for blocking the pressure build-up in the rear-wheel brakes; and, FIG. 3 is the diagram of the time-responsive variation of the pressure and of the speed of the rear wheels.

The supplemental circuit 18" according to FIG. 2 which serves as a combining and blocking circuit is required for implementing the inventive method. This circuit normally is a component of the circuitries in the control unit 18 and, therefore, is symbolized by the dotted area 18' in FIG. 1. When the control unit 18 contains microcomputers, corresponding logic combining actions and switch functions are performed by programming instructions.

As soon as the differential locks 34, 35 (at least the lock 34 in the distribution differential 29) are engaged, which has a signal at $e_1$ as a result, and a brake-slip control signal is applied to $e_2$ in addition, an AND-gate 48 as well as an OR-gate 49 cause change-over of a valve 50 which prevents further pressure build-up in the rear axle during this control period. Expediently, this valve 50 is identical with the so-termed inlet valve or the inlet valve position of the valve assembly 13 (see FIG. 1) so that in this case the electric command for change-over of the valve 50 is transmitted via the second inlet A'₃ (EV) of the OR-gate 49 to the valve 50. As long as the AND-condition at the inputs of the AND-gate 48 is not fulfilled, because the differential locks are disengaged for instance, it is not only possible to keep the pressure constant and to reduce it for the purpose of slip control, but likewise to re-increase it after re-acceleration of the wheel or after reduction of the brake slip.

The logic combining of the signals at the inputs $e_1$, $e_2$ which signal the commencement of slip control and the engagement of the differential locks as well as the subsequent OR-combining action with the braking-pressure control signal of the inlet valve EV (13) also permit realization by a corresponding programming, provided, of course, the control unit 18 contains suitable microcomputers.

Figure 3:
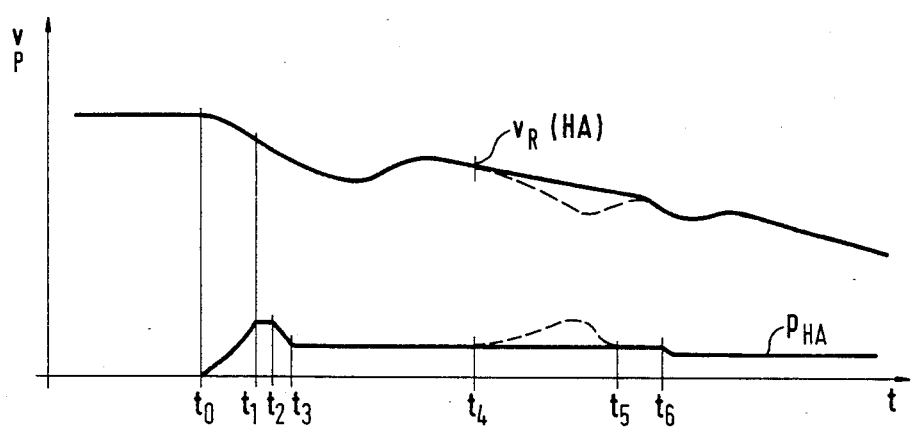

The mode of function of the inventive method and the corresponding circuit configuration is displayed in FIG. 3. In the upper curve, there is illustrated the speed variation $v_{R(HA)}$ of the rear-axle wheels during a braking action, with the differential locks engaged. Because of these locks, the two rear wheels HR, HL and also the front wheels VR, VL practically run synchronously in this situation.

The second curve in FIG. 3, that is the lower one, shows the braking pressure variation $p_{HA}$ in the rear-wheel brakes in this situation. The braking action starts at the point of time $t_0$. After the period of time $t_0$–$t_1$, a (front) wheel becomes unstable, for what reason slip control commences, first keeps the pressure constant for a short time (until $t_2$) and finally reduces it. At the point of time $t_3$, after the wheel has recovered and runs stably again, a period commences in which the pressure is maintained constant. A short-term continued pressure reduction commencing at the point of time $t_6$ is due to wheel deceleration and slip increased to be gathered from the curve $v_{R(HA)}$ which was caused by too high an amount of brake force at the front axle and transmission of this brake torque via the coupled differentials onto the rear axle.

Besides, FIG. 3 depicts in dotted lines the pressure variation and wheel speed variation within the period of time $t_4$–$t_6$ which would result without the inventive measures. The renewed increase of the braking pressure $p_{HA}$ at the rear axle at the point of time $t_4$ would have as a consequence a corresponding drop of the wheel speed $v_{R(HA)}$, that means increase of the wheel slip at the rear axle. Driving stability of the vehicle would be jeopardized by this increased slip which would be accompanied by a considerable reduction of the lateral guiding force of the wheel.

Avoiding the pressure variation illustrated in dotted lines in FIG. 3 moreover increase the control comfort. The tendency of the control system to oscillate is reduced. An extended stopping distance will not be encountered because an increased brake torque is introduced by way of the front-wheel brakes and is transmitted by way of the driving track and the locked differentials to the rear wheels.

What is claimed is:

1. A method for the control of wheel slip in a vehicle having a front axle, front wheels, a rear axle, rear wheels, front wheel brakes, rear wheel brakes and a fluid/pressure system controlling said front wheel and rear wheel brakes, an all-wheel drive mechanism including a lockable distribution differential providing a disengagable fixed coupling between the front axle and the rear axle, wheel sensors, a differential lock engagement sensor, and a combining circuit responsive to signals from the wheel sensors and the lock engagement sensor, the method comprising the steps of:

(a) initiating brake slip control and a locked-up condition of said lockable distribution differential in response to a sensed rotational condition of the wheels;

(b) generating a signal indicative of a locked-up condition of said differential; and (c) preventing any braking pressure rise in the rear wheel brakes for at least a predetermined period of time following the initiation of brake slip control in response to the presence of the differential locked-up condition signal.

2. A method as claimed in claim 1, wherein a braking pressure rise in the rear-wheel brakes (9, 10) is prevented for a period of time depending on the wheel rotational behavior.

3. The method of claim 1, wherein said vehicle further includes a second disengagable fixed coupling disposed between the rear wheels, wherein said step a) further includes initiation of a locked-up condition of the second disengagable fixed coupling.

4. A method as claimed in claim 1, wherein the braking pressure rise in the rear-wheel brakes (9, 10) is prevented until termination of said brake slip control.

5. An anti-lock brake system for controlling wheel slip in a vehicle having a front axle, front wheels, a rear axle, rear wheels, front wheel brakes, rear wheel brakes, a fluid pressure system connecting said front wheel and rear wheel brakes to a source of fluid pressure and including fluid pressure control means and an all-wheel drive mechanism including a lockable distribution differential providing a disengagably fixed coupling between the front axle and the rear axle, said system further including sensors for the measurement of the wheel rotational behavior, said sensors operatively connected to a combining circuit forming part of said fluid pressure control means, a sensor for generating a signal indicative of a locked-up condition of said differential, wherein said combining circuit (18', 18") prevents any pressure rise in the rear wheel brakes (9, 10), during slip control in response to the presence of both a signal indicating the presence of slip control and a signal indicating engagement of said lockable distribution differential.

6. An anti-lock brake system for controlling wheel slip in a vehicle having a front axle, front wheels, a pair of rear axles, a rear wheel on each rear axle, front wheel brakes, rear wheel brakes, a fluid pressure system connecting said front wheel and rear wheel brakes to a source of fluid pressure, and including fluid pressure control means and a lockable distribution differential providing a disengagably fixed coupling between said two rear axles, said system further including sensors for the measurement of the wheel rotational behavior, said sensors operatively connected to a combining circuit forming part of said fluid pressure control means, a sensor for generating a signal indicative of a locked-up condition of said differential, wherein said combining circuit (18', 18") prevents any pressure rise in the rear wheel brakes (9, 10), during slip control in response to the presence of both a signal indicating the presence of slip control and a signal indicating engagement of said lockable distribution differential.

7. An anti-lock brake system as claimed in claim 5, wherein multidirectional control valve means (13) are inserted into the fluid pressure control means leading to the rear-wheel brakes (9, 10), which valve means are adapted to be changed over by the output signal of the combining circuit (18', 18") and which, after changeover, interrupt the pressure-fluid flow to said rear brakes.

8. An anti-lock brake system as claimed in claim 7, wherein said control valve means includes inlet valves (EV) which are inserted into the fluid pressure control means leading to the rear-wheel brakes (9, 10) and are actuated by the combining circuit (18', 18").

* * * * *